May 14, 1940.　　　　　I. J. KUERT　　　　　2,200,556
LID SUPPORT
Filed Feb. 20, 1939
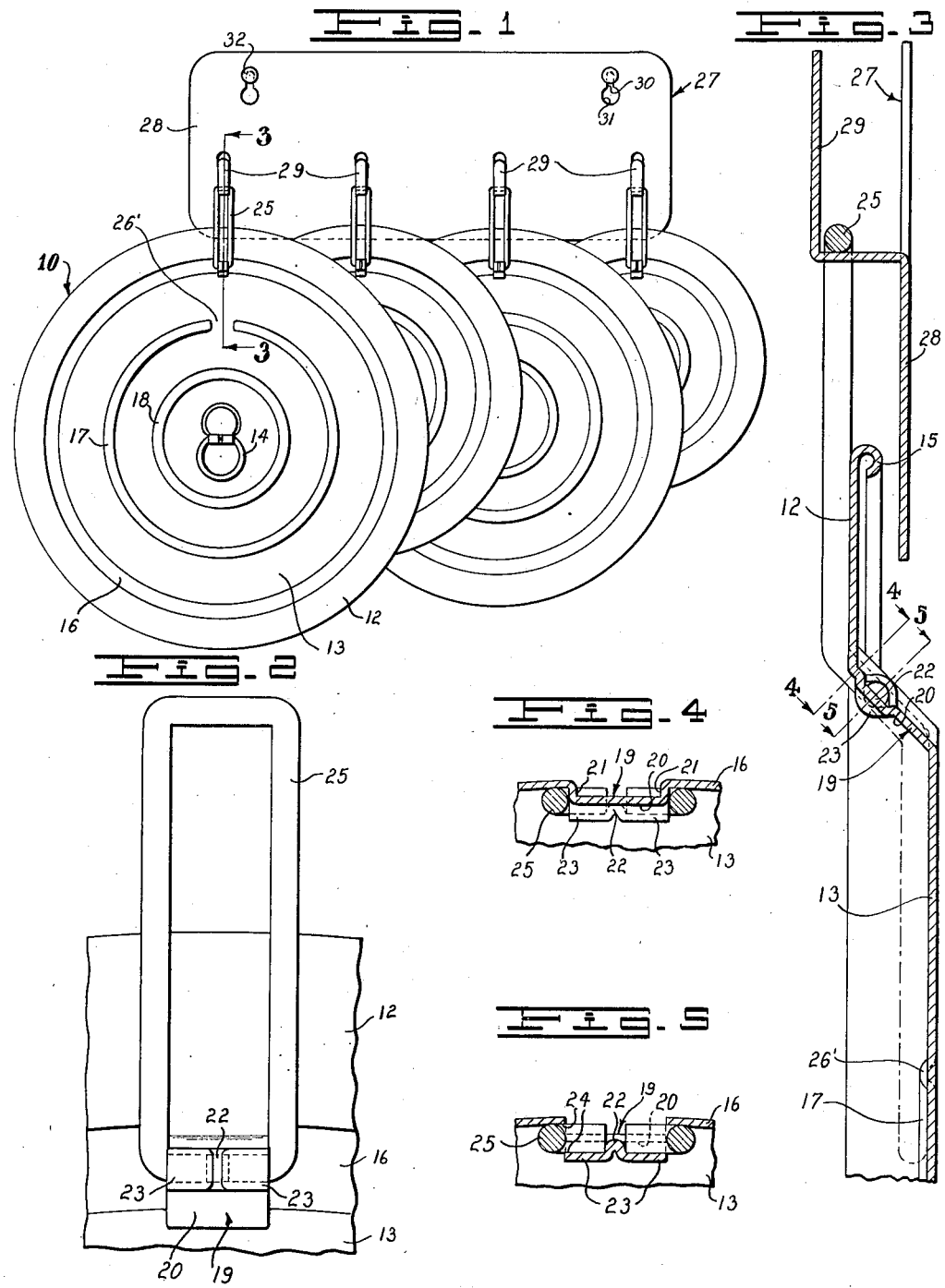
INVENTOR.
IRA J. KUERT
BY
ATTORNEY.

Patented May 14, 1940

2,200,556

UNITED STATES PATENT OFFICE 2,200,556

LID SUPPORT

Ira J. Kuert, Los Angeles, Calif.

Application February 20, 1939, Serial No. 257,309

2 Claims. (Cl. 53—8)

This invention relates to improvements in lids for pots and pans or the like.

The general object of the invention is to provide novel means for suspending a lid.

Another object of the invention is to provide a lid having a loop or handle pivoted thereto adjacent the outer edge and projecting beyond the edge.

Other objects and the advantages of this invention will be apparent from the following description taken in connection with the accompanying drawing, wherein:

Fig. 1 is a view showing a plurality of lids embodying the features of my invention suspended from the suspension member;

Fig. 2 is an enlarged fragmentary view of one of the lids shown in Fig. 1;

Fig. 3 is an enlarged fragmentary section taken on line 3—3 of Fig. 1;

Fig. 4 is a section taken on line 4—4 of Fig. 3; and

Fig. 5 is a section taken on line 5—5 of Fig. 3.

Referring to the drawing by reference characters I have indicated my improved lid generally at 10. As shown the lid 10 is made of metal and is circular in form with a peripheral flange portion 12 and a depressed central portion 13 at the center of which it includes the usual pivoted loop member 14.

For strength the outer flange 12 includes a rolled outer edge 15. The lid includes a frustro-conical stepped portion 16 and spaced stiffening beads 17 and 18.

On the stepped portion 16 I provide an outstruck boss portion 19 having a top 20 and sides 21. The center of the boss is depressed as at 22 and at each side of the depression the boss is raised as at 23. The sides of the raised position 23 are removed so that sockets 24 are provided.

A handle or loop member 25 is made from a single length of wire bent in the form of a rectangle with the free ends positioned in the sockets 24. The loop includes an inner portion and an outer portion with the portions arranged at an angle and with the inner portion engaging the frustro-conical stepped portion. The free end of the loop 25 serves to hold the latter against accidental turning.

The attached end of the loop is so bent that it extends outwardly beyond the periphery of the lid as shown in Figs. 1, 2 and 3 with the inner end 26 of the loop engaging the flat portion of the lid and the stepped portion and with the loop at each side of the boss 19. When the loop 25 is swung inwardly to a retracted position as indicated by the broken lines in Fig. 3, the inner end engages the stepped portion and the free end engages the bottom of the pan. The bead 17 is omitted as at 26 to allow the loop to engage the bottom of the pan.

In Figs. 1 and 3 I have shown a lid supporting device which is indicated generally at 27. As shown the device 27 comprises a flat metal body portion 28 having adjacent the lower edge thereof a plurality of outstruck hook members 29 thereon. Adjacent the upper edge and adjacent each end the body 28 has an elongated aperture 30 therein which at its lower end opens into an enlarged circular aperture 31. The apertures 31 are adapted to receive the shank of a nail or screw 32 after the head thereof is passed through the aperture 31.

From the foregoing description it will be apparent that I have provided an improved lid member which is simple in construction and highly efficient in use.

Having thus described my invention I claim:

1. In a lid, a circular body having a flat edge portion at its periphery, said body having a frustro-conical stepped portion within the flat edge portion, an upwardly directed boss on said stepped portion, said boss having apertured end walls, a support formed from a single length of wire and including a rectangular body and end portions fitting the boss apertures said support body including an inner and an outer portion arranged at an angle to the inner portion, the inner portion of the support engaging the stepped portion of the lid and the outer portion of the support permitting the support to engage the flat edge portion or to engage the lid within the stepped portion.

2. In a lid, a circular body having a flat flange portion at its periphery, a frustro-conical stepped portion adjacent to said flange portion, an upwardly directed boss on said stepped portion, said boss having side walls with aligned apertures in the side walls, a support formed from a single length of wire and including a rectangular body, the support having end portions fitting the boss apertures, said support body including an inner and an outer portion arranged at an angle to the inner portion, the inner portion of the support engaging the stepped portion of the lid and the outer portion of the support permitting the support to engage the flange portion or to engage the lid within the stepped portion said body having a circular bead therein, said bead being interrupted, said support engaging the body where the bead is interrupted when the support is turned inwardly, said support being adapted to be turned outwardly to engage the flange, said support body being of a length to extend beyond the flange when the support is turned outwardly.

IRA J. KUERT.